United States Patent

Murray, Jr. et al.

[11] Patent Number: 5,324,914
[45] Date of Patent: Jun. 28, 1994

[54] METHOD AND APPARATUS FOR WELDING PRECIPITATION HARDENABLE MATERIALS

[75] Inventors: Holt Murray, Jr., Hopewell, N.J.; Ian D. Harris, Dublin, Ohio; John O. Ratka, Cleveland Heights, Ohio; William D. Spiegelberg, Parma, Ohio

[73] Assignees: Trustees of Princeton University, Princeton, N.J.; British Technology Group USA, Gulph Mills, Pa.

[21] Appl. No.: 951,209
[22] Filed: Sep. 25, 1992
[51] Int. Cl.⁵ .............................................. B23K 9/23
[52] U.S. Cl. ............................................. 219/137 WM
[58] Field of Search ............... 219/137 WM, 146.22; 228/231

[56] References Cited

U.S. PATENT DOCUMENTS

| | | | |
|---|---|---|---|
| 1,986,303 | 1/1935 | Swift | 219/10 |
| 1,990,168 | 2/1935 | Corson | 148/21.2 |
| 2,027,750 | 1/1936 | Munson | 148/21.2 |
| 2,275,188 | 3/1942 | Harrington | 148/21.2 |
| 2,325,041 | 7/1943 | Cooper | 148/13.2 |
| 3,031,568 | 4/1962 | Turner | 219/137 |
| 4,119,830 | 10/1978 | Gilliland | 219/132 |
| 4,179,314 | 12/1979 | Wikle | 148/12.7 |
| 4,213,026 | 7/1980 | Duvall et al. | 219/137 WM |
| 4,336,441 | 6/1982 | Godai et al. | 219/137 |
| 4,355,224 | 10/1982 | Mesick et al. | 219/137 |
| 4,447,703 | 5/1984 | Stol | 219/136 |
| 4,460,659 | 7/1984 | Pedersen et al. | 428/675 |
| 4,539,465 | 9/1985 | Bosna | 219/137.7 |
| 4,594,116 | 6/1986 | Inagaki | 148/12.7 |
| 4,724,013 | 2/1988 | Church et al. | 148/12.7 |
| 4,724,302 | 2/1988 | Penney et al. | 219/130.21 |
| 4,738,388 | 4/1988 | Bienek et al. | 228/135 |
| 5,217,158 | 6/1993 | Spiegelberg et al. | 228/231 |

OTHER PUBLICATIONS

Murray, Holt; Harris, Ian D.; Ratka, John O.; "Development Of A Welding Procedure For High Conductivity, Copper-Beryllium Alloy C17510", IEEE Publication No. 91CH3035-3, 1992, pp. 272-275.

Primary Examiner—Clifford C. Shaw
Attorney, Agent, or Firm—Watov & Kipnes

[57] ABSTRACT

A method for welding together members consisting of precipitation age hardened materials includes the steps of selecting a weld filler material that has substantially the same composition as the materials being joined, and an age hardening characteristic temperature age threshold below that of the aging kinetic temperature range of the materials being joined, whereby after welding the members together, the resulting weld and heat affected zone (HAZ) are heat treated at a temperature below that of the kinetic temperature range of the materials joined, for obtaining substantially the same mechanical characteristics for the weld and HAZ, as for the parent material of the members joined.

21 Claims, 4 Drawing Sheets

METHOD AND APPARATUS FOR WELDING PRECIPITATION HARDENABLE MATERIALS

GOVERNMENT LICENSE RIGHTS

This invention was made with Government support under Contract No. DE-AC02-76CH03073, awarded by the Department of Energy. The Government has certain rights in this invention.

FIELD OF THE INVENTION

The field of the present invention relates generally to welding, and more particularly to the welding of precipitation hardenable materials.

BACKGROUND OF THE INVENTION

Many different welding techniques and processes have been developed for joining metal materials together. When metal materials are joined by welding, the physical integrity of the structural member formed is typically limited by the weld zone properties. The weld zone consists of weld filler material, a heat affected zone (HAZ), and the material joined. Significant distortion may occur in thick section members joined together by a welding process. Asymmetry of the weld, of the weld process with time, asymmetry of the weld filler build, and unbalanced residual stresses are primary causes of such distortion. In welding thick parts or materials having a high thermal conductivity, the substantial heat sinking property of such parts or material poses problems in obtaining satisfactory welds that specifically insure sidewall penetration and pass-to-pass penetration. To overcome these problems, known welding techniques typically utilize plural low volume weld passes and substantial preheating of parts in an effort to limit distortion, and insure weld penetration. Such techniques tend to limit the geometry of the parts joined, limit weld production rates, limit the physical integrity of the weld, and tend to increase the cost of production. The physical integrity of the weld filler, and the region (zone) of softened parent material resulting from the welding process, are primary limitations of the known techniques.

The problems noted above in welding metal members together are of particular concern when the associated materials are high performance materials and the application is high consequence. Examples of high performance material are precipitation hardenable alloys. Such alloys include but are not limited to nickel, aluminum, and copper dominated metals, and so forth. Copper-beryllium-nickel alloy plate material is one particular example of such precipitation hardenable alloy materials, and is of particular interest to the present invention, but the present invention is applicable for use with many other such materials. A number of references attempting to solve problems in the prior art associated with such materials, and the joining of members constructed of such material, are discussed below.

Swift, U.S. Pat. No. 1,986,303, teaches a method for welding copper, or copper alloys. It is indicated that carbon arc welding is preferred for welding copper alloys of copper. The method uses a higher voltage in the welding process to provide a longer arc, for producing stronger welds.

Corson et al., U.S. Pat. No. 1,990,168, teaches the heat treatment of copper alloys. More particularly, the heat treatment of copper beryllium alloys is taught.

Munson, U.S. Pat. No. 2,027,750, teaches a copper base alloy for providing improved hardness, strength, ductility, and a wide heat treating temperature range. Heat treating ranges are given for the various compositions shown.

Harrington, U.S. Pat. No. 2,275,188, teaches a process for improving the properties of precipitation hardenable copper base alloys. The alloys are subjected to "double aging".

Cooper, U.S. Pat. No. 2,325,041, teaches a method for joining beryllium into copper. The precipitation hardening of alloys of beryllium copper is discussed.

Turner, U.S. Pat. No. 3,031,568, teaches a process for arc welding copper material. The process involves welding copper in the presence of an inert gas, along with a welding filler rod mainly comprising copper, and also including boron.

Gilliland, U.S. Pat. No. 4,119,830, teaches a control system for providing remote welding of materials. The system includes remotely controlled motors for automatically feeding welding wire to the weld site, and control circuitry for controlling the operation of the welding head.

Wikle, U.S. Pat. No. 4,179,314, teaches a process for double age hardening of alloys of beryllium-copper.

Mesick et al., U.S. Pat. No. 4,355,224, shows the use of a coated electrode for use in arc welding.

Godai et al., U.S. Pat. No. 4,336,441, teaches a welding process for providing a particular composition for welding wire used in a TIG (tungsten inert gas) welding process, whereby the arc and welding head are controlled for oscillating or weaving the resultant weld bead as it is being applied to the pieces being joined. Note in columns 15 and 16 of this patent, it is indicated that heat treatment of the weld bead is provided by the arc heat from the non-consumable electrode.

Stol, U.S. Pat. No. 4,447,703, teaches a welding method for preheating a consumable wire electrode immediately prior to melting in an electric arc during the welding process. Both tungsten inert gas and metal inert gas processing is taught.

Pedersen et al., U.S. Pat. No. 4,460,659, teaches a copper alloy welding filler composition for use in arc welding copper. The composition includes boron. and zirconium with copper.

Bosna, U.S. Pat. No. 4,539,465, teaches a system for both storing and feeding welding wire. The system is included in a robotic welding system.

Inagaki, U.S. Pat. No. 4,594,116, teaches a method for processing copper-beryllium alloys. The process includes heat treating the alloy at a temperature of 750° to 950° for a period of time within a range of one to four hours.

Church et al., U.S. Pat. No. 4,724,013, teaches a method for heat treating copper beryllium alloys.

Penney et al., U.S. Pat. No. 4,724,302, teaches a robotic system for controlling the feeding process in welding processes, for example.

Bienek et al., U.S. Pat. No. 4,738,388, teaches a process for sealing a container storing radioactive material. A welding seam 17 is used in order to seal a cover or lid to the container.

SUMMARY OF THE INVENTION

With the problems of the prior art in mind, one object of the invention is to provide an improved method and apparatus for joining via welding pieces of material consisting of precipitation hardenable alloys, either in their precipitation hardened state or solution annealed state.

Another object of the invention is to provide a weld filler consisting of precipitation hardened alloy for joining members fabricated from precipitation hardened alloys.

Yet another object of the invention is to provide a weld filler wire with a contamination reducing coating and enhanced current pickup and conduction for use in joining members fabricated from precipitation hardenable alloys.

Another object of the invention is to provide a method and apparatus for substantially reducing distortion in the weld area of members consisting of precipitation hardenable alloys.

Another object of the invention is to provide a method and apparatus for reducing the required preheat temperatures of relatively thick parts fabricated from precipitation hardenable alloys.

Yet another object of the invention is to minimize the width of the heat affected zone (HAZ) obtained in welding together pieces of precipitation hardenable alloy material.

Another object of the invention is to provide an improved method and apparatus for welding precipitation hardenable materials for improving the mechanical integrity of the weld joint, and increasing the thermal and electrical conductivity of the weld bead and HAZ.

Still another object of the invention is to provide an improved apparatus and method for welding at a high weld wire feed speed and high energy density.

These and other objects of the invention are provided by an apparatus and method for welding together precipitation hardenable materials in one embodiment. The weld filler material is chosen to have a chemistry approximating the materials to be joined. Also, the weld filler material is chosen to be age hardenable, and to have a precipitation hardening temperature that is lower than the age hardening temperature threshold of the materials being joined. After materials are welded together, the weld filler and HAZ are heat treated to both enhance the thermal/electrical conductivity, and the physical integrity. After heat treating the weld assembly physical characteristics approach that of the parent material. During the welding process, in one embodiment synergic pulsed gas metal arc welding apparatus incorporating a modified torch tip is operated with a pulse current parameter schedule providing for the deposition of weld filler with high arc stability, high metal transfer rate, and minimal wire spatter.

BRIEF DESCRIPTION OF THE DRAWINGS

Various embodiments of the invention are illustrated and described below with reference to the accompanying drawings, in which like items are identified by the same reference designation, wherein.

DETAILED DESCRIPTION OF THE INVENTION

Figure 1:
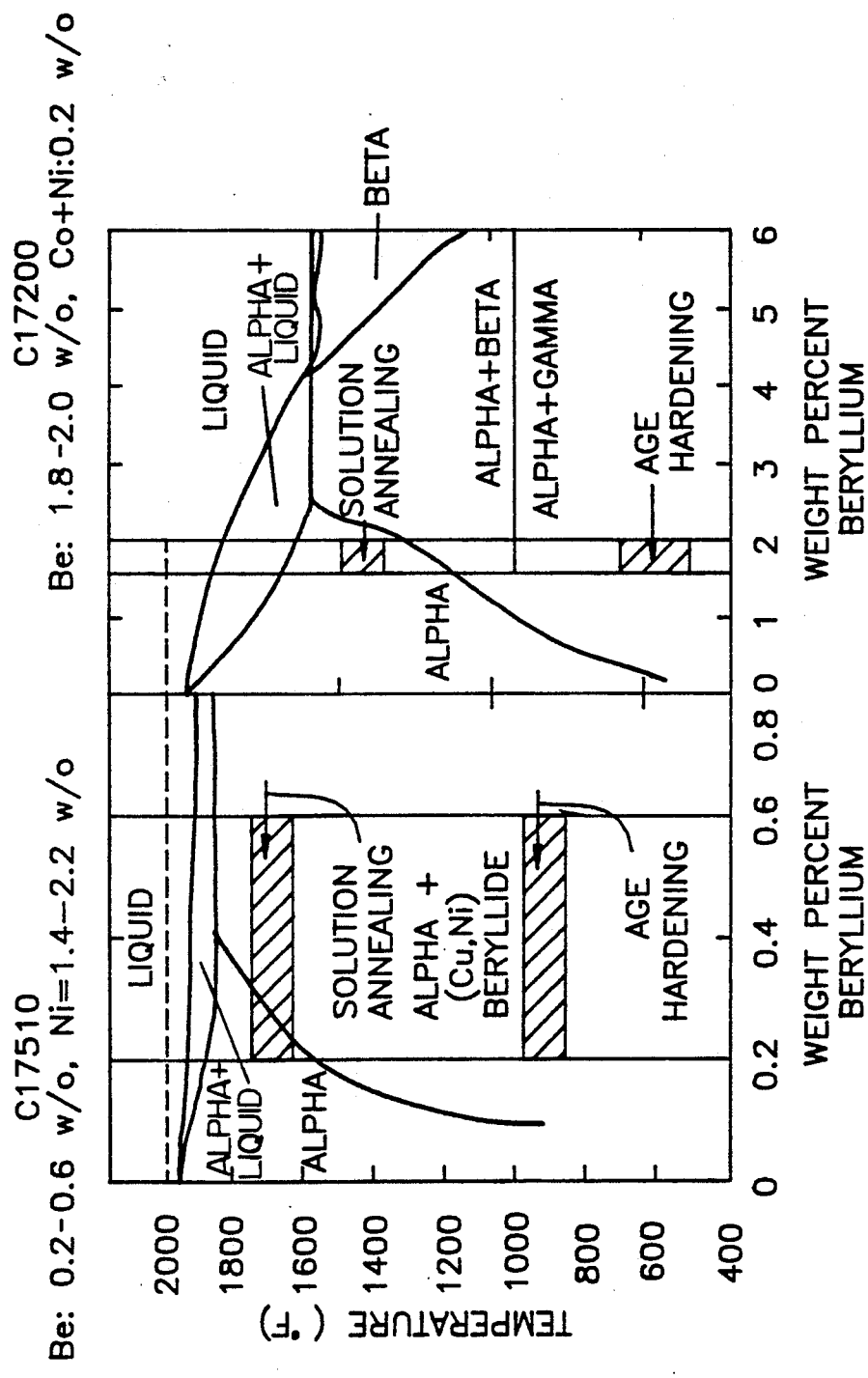
FIG. 1 shows a composite phase diagram for C 17510 and C 17200 materials.

As mentioned above, the present invention provides in its various embodiments, a method and apparatus for substantially improving the physical integrity of a weld. In broad terms, this is achieved through optimizing four aspects of the welding procedure. The first aspect is to select a weld filler material using criteria which include chemical composition considerations, phase diagram attributes, and physical integrity after precipitation hardening. A second aspect is the selection of the weld process parameters for obtaining a high energy density/high mass transfer rate between the weld filler material and the material of the parts being joined. A third aspect is the use of an automated welding system providing close regulation of the welding process. The fourth aspect involves the use of a post weld heat treatment.

The various embodiments of the present invention are applicable for joining by welding members consisting of precipitation hardenable alloys, as previously indicated. Such alloys include but are not limited to nickel, aluminum and copper dominated metals, and so forth. For purposes of illustration, the joining of a copper-beryllium-nickel alloy plates of 1.1 inch thickness are discussed below in various examples of the present welding apparatus and process or method, but the invention is applicable for use with substantially any precipitation hardenable alloy.

In broad terms, the present method of welding produces a fusion region of high integrity that is further processed via post weld heat treatment for enhancing and balancing the strength of both the weld filler and heat affected zone (HAZ). As a result, tensile fractures of the weld zone involve rupture of the parent material, HAZ, and weld filler. Such postweld heat treatment, described in greater detail below, enhances both the physical integrity and thermal/electrical conductivity of the weld filler and HAZ. Also, it has been determined that the HAZ strength and conductivity of adjoining members is significantly recovered to the preweld condition. Further, the present method yields physical properties for the weld region that approach the characteristics of the surrounding material of the joined members, with the weld zone exhibiting over 80% of the strength of the parent material. Tensile fractures of the weld assembly cross all three regions of the weld, i.e., the weld filler, the HAZ, and the parent material, confirm the aforesaid balance of physical properties provided by the present method of welding, and heat treatment.

As indicated, the parts or members to be joined are fully aged in that they have been previously precipitation hardened, thereby eliminating the requirement for heat treating the entire welded assembly. The weld filler material is chosen to be age hardenable, and to have a precipitation hardening temperature lower than the temperature where significant aging kinetics are triggered in the material of the parts or members joined. The chemistry of the weld filler material is chosen to approximate that of the material of the parts to be joined.

The method and apparatus include a synergic pulsed gas metal arc welding technique which is optimized for maximum mass transfer and arc stability. The welding technique is configured to limit the size of the heat affected zone (HAZ), and minimize preheating of the parts or members being joined. A shielding gas stream is selected to provide maximum mass transfer, optimum arc-stability, and protect the weld pool during cooling. The present method provides a low distortion weld, thereby allowing thick members to be joined through use of an asymmetric pass sequence, yet avoiding significant fixturing and elevated preheat temperatures. The weld preparation geometry of the work pieces or members being joined is designed as a closed gap configuration. The weld process technique results in full penetration of the first root pass, providing an inspectable and coherent bead on the opposite face of the members joined. Precautions are taken to minimize contamination of the gas stream, the weld bead surfaces, and the filler wire. In one example given below, the method includes a ceramic backing for partially supporting the first root pass bead, and enhancing the penetration margin.

Unlike typical prior techniques, the present welding process or method includes high energy density (a result of high arc current and arc voltage), and high wire feed speeds (which results in high mass transfer rates), using known apparatus. The associated apparatus is modified in order to insure adequate arc current conduction to the weld filler wire, and through the wire itself to the arc initiation site, while maintaining sufficient heat sinking of the wire to the torch tip. A modified torch tip is used, as described in detail below.

Also as described in greater detail below, the filler wire is plated to minimize process contamination, improve electrical conductivity, and enhance the arc threshold as a current ring supporting the arc, a condition which improves arc stability. A copper plating is used on the filler wire in one example.

Greater details of the actual welding process and method of the present invention will now be given, using actual data from tests made to join age-hardened C 17510 copper-beryllium plates. A C 17200 weld filler wire was used in the experiments.

A gas shielded-arc welding process employing inert gas such as argon and/or helium is utilized, in this example. As previously mentioned, a consumable wire electrode composed of an age-hardenable material, similar in chemistry to that of the material of the members being joined is used, but is chosen to have an aging characteristic at a temperature below the kinetic threshold of the material of all the members being joined. In this regard, phase diagrams, as shown in FIG. 1, were used to select an appropriate weld wire composition for welding the C 17510 plates, in this example. Note that the age hardening temperature range of the C 17200 weld wire selected is about 550° F. to 750° F., which is substantially lower than the about 890° F to 990° F age hardening temperature range for the C 17510 plates.

The weld filler wire is chemically prepared for controlling impurities, dimensional configured for providing high current density pickup and adequate heat sinking to the associated torch tip, and is plated for preventing impurity buildup, and for increasing surface conduction, a condition which enhances the formation of a conical arc. The associated torch tip is aggressively cooled and mechanically matched to the weld wire size for insuring adequate high current density pickup, and for providing sufficient heat sinking for the high energy density weld. A fully programmable synergic pulsed gas metal arc welding (GMAW) inverter power source, a typical welding controller, a welding gun on a mechanized carriage, a cooling water system, and a shielding gas delivery system, are included for providing the welding apparatus requirements.

Figure 2:
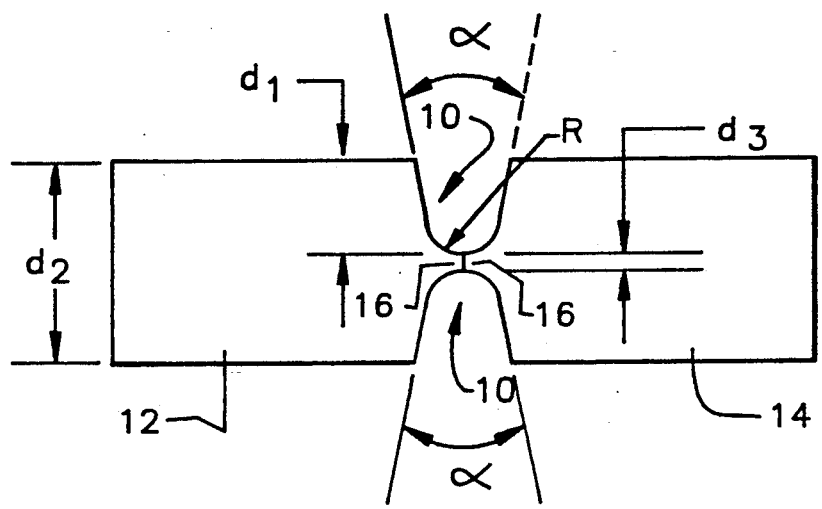
FIG. 2 is a simplified front elevation view showing a double U butt joint preparation for one embodiment of the invention.

The welding operation itself is performed under a slight negative pressure, within an enclosure where the atmosphere is isolated from the laboratory environment, and fumes are exhausted and filtered. The plate surfaces to be welded are machined with a symmetric double "U" shaped 10, closed gap weld preparation, as shown in FIG. 2. Note, the use of a symmetric double "U" preparation is not meant to be limiting. For example, a double "V" or configurations both symmetric and asymmetric can be used. The plate material chosen for the experiments was flat stock in an age hardened condition. The welding arc was maintained perpendicular to the plane of the plate material 12, 14 joined. Preheating of the plates 12, 14 to be joined was minimized, and the temperature excursion after each pass was relatively limited compared to other weld processes.

Four system parameters are controlled in conducting the present weld process or method. These parameters include arc current, arc voltage, wire feed speed, and torch travel speed. Other control process parameters include the start-up current profile, the pulse current, the pulse duration, background current, pulse frequency, the burnoff-current/voltage curve, rampdown profile and the shielding gas flow rate and mixture. The weld pass schedule for providing the order of weld bead placement is in the present method dictated by the ease of the welding operation, rather than by consideration of warping or distortion balance issues. The associated heat treating method provides for programmed heating of the weld zone bracketed by aggressively heat sinked areas where the precipitation age hardening process is monitored by NDE (nondestructive examination) techniques, including but not limited to eddy current coupling into the surface of the weld region. Weld integrity was evaluated through use of two complementary standard industrial inspection methods, ultrasonic inspection and radiographic examination, in this example.

In this example, the weld filler wire is composed of CDA C 17200, as previously mentioned, in the one-quarter hard condition. The chemistry (as defined by CDA) of this material is important to the welding process since its viscosity dictates the flow of the liquid in the molten pool and any impurity content significantly influences the stability of the metal transfer across the associated arc. The wire composition is CDA C17200, with the preferred composition approximately 1.85 w % Be, 0.24 w % Co, 0.04 w % Ni, 0.06 w % Fe, 0.1 w % Si, 0.05 w % Al, <0.005 w % Sn, <0.005 w % Cr, and the balance being comprised of copper. Also in the preferred embodiment, the weld wire is processed to remove surface contaminants such as lubricating organics, for example, and thereafter plated with substantially pure copper to a thickness of between 25 and 75 microns, wherein 50 microns is the preferred thickness. After plating, in this example, the wire diameter must be in a diameter range of 0.035 to 0.055 inch, with the mid point of the range being the preferred diameter.

The torch tip of the torch must in this example be capable of sustaining a D.C. arc current having a magnitude of about 500 amperes. In this example, a heavy duty tip for high current gas metal arc welding for 0.045 inch weld wire, manufactured by Binzell, located in Switzerland, was used. Because of the heat generated by such a large magnitude of current, aggressive water cooling must be applied to the torch tip. In this example, the bore of the torch tip serves both as a heat sink for the weld wire, for preventing premature melting of the wire before it enters the arc stream, and as a current collection path. Selection of the torch tip is critical in view of the high wire feed rate, as indicated below, and in view of the high current density required for the welding process. A compromise must be made in choosing the bore diameter of the torch tip. Current pickup and heat sinking considerations dictate a tight fit between the weld wire outside diameter and the inside diameter or bore of the torch tip. However, a loose fit therebetween is dictated in view of thermal expansion of the weld wire, and non-uniformity of the outside diameter of the weld wire. In this example, it was determined that the bore or inside diameter of the torch tip must be modified to be in the range of 0.065 inch, to be 0.020 inch larger than the average outside diameter of the 0.045 inch weld wire. Note that standard commercially available welding equipment is used in carrying out the method of the present invention. The diameter of the standard torch tip was modified in this example to have a diameter as previously indicated.

The commercially available welding equipment used in this example includes a programmable inverter power supply capable of providing both synergic pulsed gas metal arc welding (GMAW), and steady D.C. GMAW. The inverter used in this example was a L-TEC Digipulse 450 (manufactured by L-TEC Welding & Cutting System, South Carolina). The equipment further includes a water cooled welding gun mounted on an index carriage for permitting control of linear travel thereof at programmed speeds. This particular power system is capable of a background DC arc current, programmable to above 250 amperes, with 150 to 200 amperes being the preferred range of operation. Superimposed onto the background or base current is a pulse current having a programmable magnitude up to about 500 amperes. The preferred pulse amplitude is 200 to 300 amperes, in this example. The preferred pulse frequency for the pulse current is 300 Hz.

It should be noted that the presently illustrated copper-beryllium alloy of this example, and other alloy materials, generate fumes during the welding process that present health and safety concerns and/or hazards. The dominant source of such fumes is generated from the weld filler wire, which in this example contains beryllium. However, the above-mentioned wire preparation tends to suppress the generation of fumes. Also, the synergic pulsed GMAW process typically produces a stable arc and minimized spatter. Integrated fume generation is also minimized by the characteristic high rate of mass transfer of the present method. Regardless, the prototype system provides for enclosing the entire weld process within a steel chamber maintained at a negative pressure relative to the surrounding air pressure. Fumes generated are exhausted and filtered to conform with permissible exposure limits specified in OSHA Document 3112 "Air Contaminants—& Permissible Exposure Limits". Also, the present system is provided with a fume extraction system including a four-stage filter including a high efficiency particulate air filter (HEPA). Also, monitoring of the negative pressure within the welding chamber, and the status of the filter efficiency should be routinely performed during the welding process.

The present inventors pursued extensive experimentation using the present method of welding and associated apparatus for butt welding two 1.1 inch thick ($d_2$ in FIG. 2) C 17510 plates 12, 14 together. Preferred process parameters were obtained, and are described below for joining the two plates 12, 14 each measuring 6 inches wide by 24 inches long with the long dimensioned edge containing a symmetric double "U" weld preparation. As previously mentioned, the FIG. 2 example shows the "U" weld preparation 10 between the abutted plates 12, 14. The weld preparation 10 includes a 0.2 inch radius sweep R at the base, outwardly diverging surfaces having a 20° enclosed angle $a$, and a root face of 0.06 inches thick ($d_3$) at the plate's approximate centerline. A 0.06 inch thick tab 16 from one plate 12 or 14 is aligned and pressed into the comparable detail of the other plate to be joined with, thereby providing a "closed gap" preparation, in this example. The depth $d_1$ of the top and bottom gaps is about 0.488 inch from the top and bottom surfaces, respectively. The two plates 12, 14 to be joined are positioned on a flat table and secured for retaining them in position during equipment setup, rather than to prevent warping of the plates as in prior welding methods. A preheating step is next performed for the assembly to preheat the plates 12, 14 to a temperature ranging from 200° F. to 400° F. Note that 300° F. has been determined to be the preferred temperature, in this example.

Figure 3:
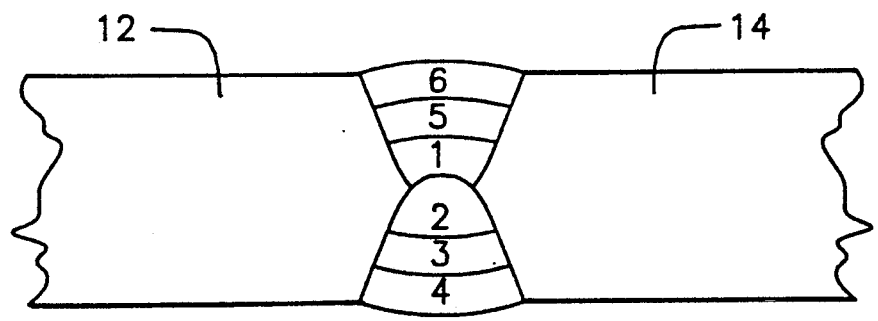
FIG. 3 is a simplified pictorial view showing a welding sequence for the double U butt joint of FIG. 2 for one embodiment of the invention.

In the preferred embodiment, a ceramic backing is installed to aid in the support of the initial root pass. Root passes are sequentially installed with parameter ranges and preferred parameters as indicated below in Table 1. FIG. 3 shows the welding sequences for joining the two plates 12, 14 together.

TABLE 1

| | ROOT PASSES | |
|---|---|---|
| Parameter | Parameter Range | Preferred Value |
| Mean Arc Current | 250–400 A (Amperes) | 390 A |
| Arc Voltage | 27–32.5 V (Volts) | 30 V |
| Wire Feed Speed | 375–575 in/min | 525 in/min |
| Torch Travel Speed | 10–20 in/min | 18 in/min |

Before starting the present arc welding process, the shielding gas, a mixture of Helium—25% Argon is purged through the lines to clean impurities and establish a steady gas flow. The gas flow for the root passes is preferred to be in the range of 80 cfh. With further reference to FIG. 3, a first root pass 1 is installed on one face of plates 12, 14 as abutted, with the ceramic backing (not shown) in place, and then the assembly is rotated to expose the double "U" preparation on the opposite face of plates 12 and 14. A second root pass 2 is then installed on the opposite face, followed by a fill pass 3 and capping pass 4, as shown. These two passes 3 and 4 are preferred to be produced at slightly higher weld process parameters than the root passes 1 and 2. The gas flow for the passes 1–6 is preferred to be in the range of 120 cfh.

TABLE 2

| | FILL AND CAPPING PASSES | |
|---|---|---|
| Parameter | Parameter Range | Preferred Value |
| Mean Arc Current | 350–450 A | 430 A |
| Arc Voltage | 27–32.5 V | 30 V |
| Wire Feed Speed | 500–575 in/min | 575 in/min |

TABLE 2-continued

FILL AND CAPPING PASSES

| Parameter | Parameter Range | Preferred Value |
|---|---|---|
| Torch Travel Speed | 10–20 in/min | 12 in/min |

After capping pass 4 is completed for the opposite face, the assembly is rotated for performing fill pass 5 and capping pass 6 on the original face. No cleaning is required between passes, and pass balancing is unnecessary. Table 2 (see above) shows the parameters for the fill passes 3, 5 and capping passes 4, 6. The process pulse parameters, parameter range, and preferred values are summarized below in Table 3.

TABLE 3

PULSE PARAMETERS

| Parameter | Parameter Range | Preferred Value |
|---|---|---|
| Pulse Current | 400–500 A | 500 A |
| Pulse Duration | 1–3 ms | 1.7 ms |
| Background Current | 100–300 A | 210 A |
| Pulse Frequency | 200–700 Hz | 300 Hz |

The last step in the present process is the heat treatment of the weld and the associated heat affected zone (HAZ). Both the weld and the HAZ are heated for a predetermined time at a predetermined temperature. As previously mentioned, the required heat treatment is determined for providing that the properties of the plates being joined remain substantially unaffected, while triggering age hardening of the HAZ, and more importantly the weld filler. It is important to note that the heat treatment for the weld filler is predetermined for precipitation hardening the weld filler from the cast state of the weld filler. In prior heat treatment methods, the solution annealed condition is the standard starting point for triggering precipitation hardening of a material. Also, the time range determined for the present example for heat treating the weld and HAZ is from 0.5 to 5 hours at a temperature ranging from 775° F. to 950° F. The preferred values for these ranges are 5 hours at 850° F. for the present heat treatment, in this example for the above-indicated plates 12, 14. However, in other applications, multiple temperatures and times may be utilized. Different materials may require different temperatures and time periods.

After the heat treating step, the weld is typically inspected. In this example, such inspection is accomplished by a radiographic inspection under ASME IX QW 191.2.2, the weld quality standard of the boiler and pressure vessel code. Also ultrasonic inspection using either a through transmission beam or a reflected beam may be used to document weld quality.

Figure 4:
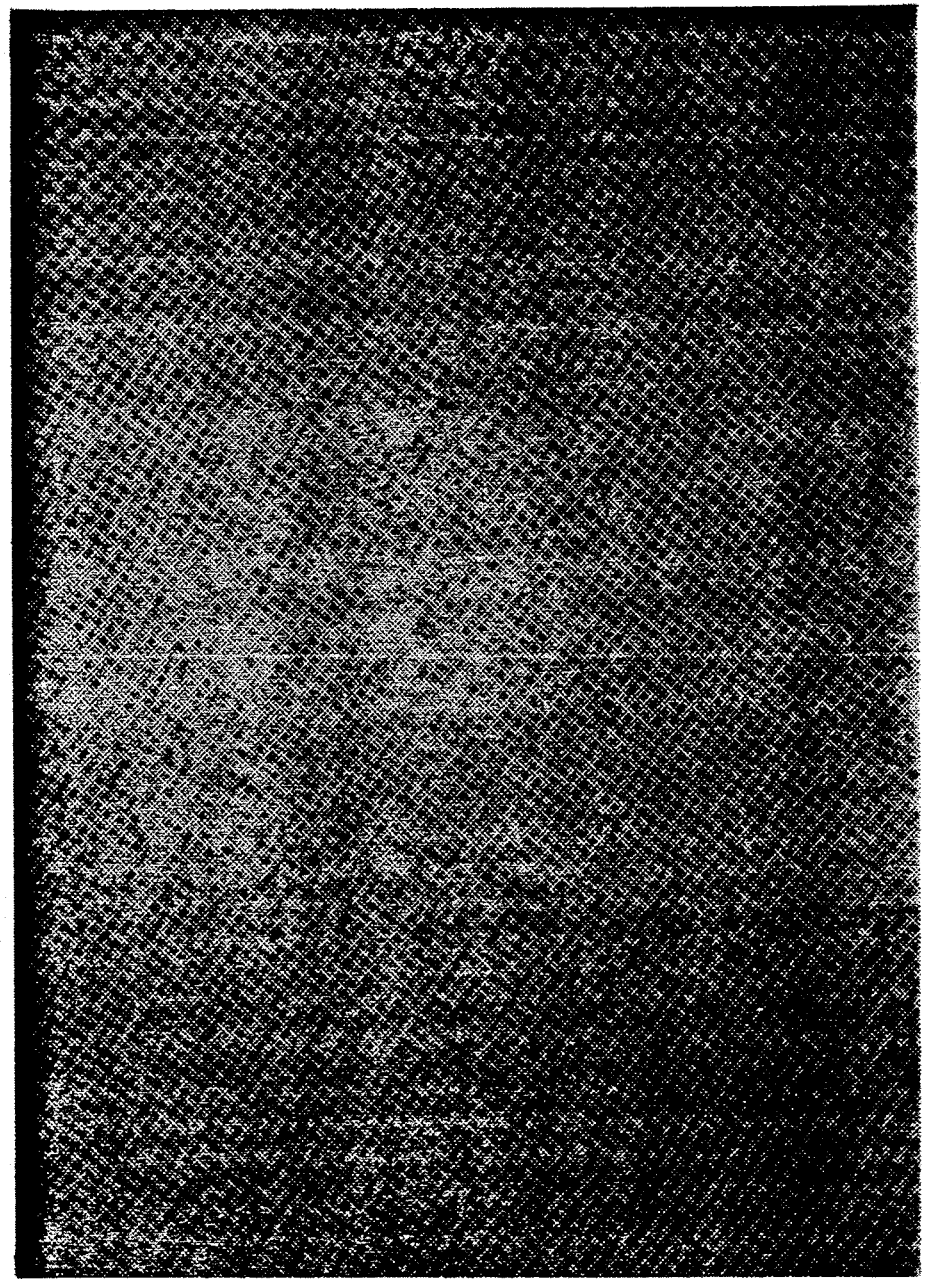
FIG. 4 shows a 125x micrograph of a sectional cut showing weld filler, HAZ, and parent material for a weld produced using embodiments of the invention.

For the experiments made, a sectional cut through a typical weld obtained using the present method, showed overlapping penetrations of the root passes 1, 2, and side wall penetration into the parent material. Also, the parent N material forming the closed gap 16 is consumed by the first root pass 1 as was seen in the sectional cut. In FIG. 4, a 125x micrograph of a sectional cut shows weld filler, HAZ, and parent material interfaces. The micrograph demonstrates the attainment by the present method of a very narrow HAZ with grain continuity from the HAZ into the weld filler, after heat treating.

In summary of the present example for joining thick plates of age hardened copper-beryllium material, a weld filler that chemically is substantially of the same composition as the material of the plates being joined is utilized. However, the weld filler material is rich in beryllium. Also, the weld filler material is chosen to be age hardenable at a temperature/age threshold below that of the material of the plates being joined. As a result, the weld wire used is beryllium rich relative to the material of the plate, as is the final weld filler, as previously indicated. The weld wire is converted during the welding process to a metallic stream upon exiting the associated weld tip, for deposit onto the plates within the double "U" channels as weld filler material. It is important to note that the weld wire material undergoes a lowering of its beryllium content, making the resulting weld filler material chemically closer to the material of the plates being joined. The present inventors believe, but have not proven, that the beryllium in the weld filler enriches the incident interface material of the parent plates, causing this area of the associated plates to have a reduced temperature for age hardening, thereby enhancing the heat treatment induced strengthening of the HAZ.

Figure 5:
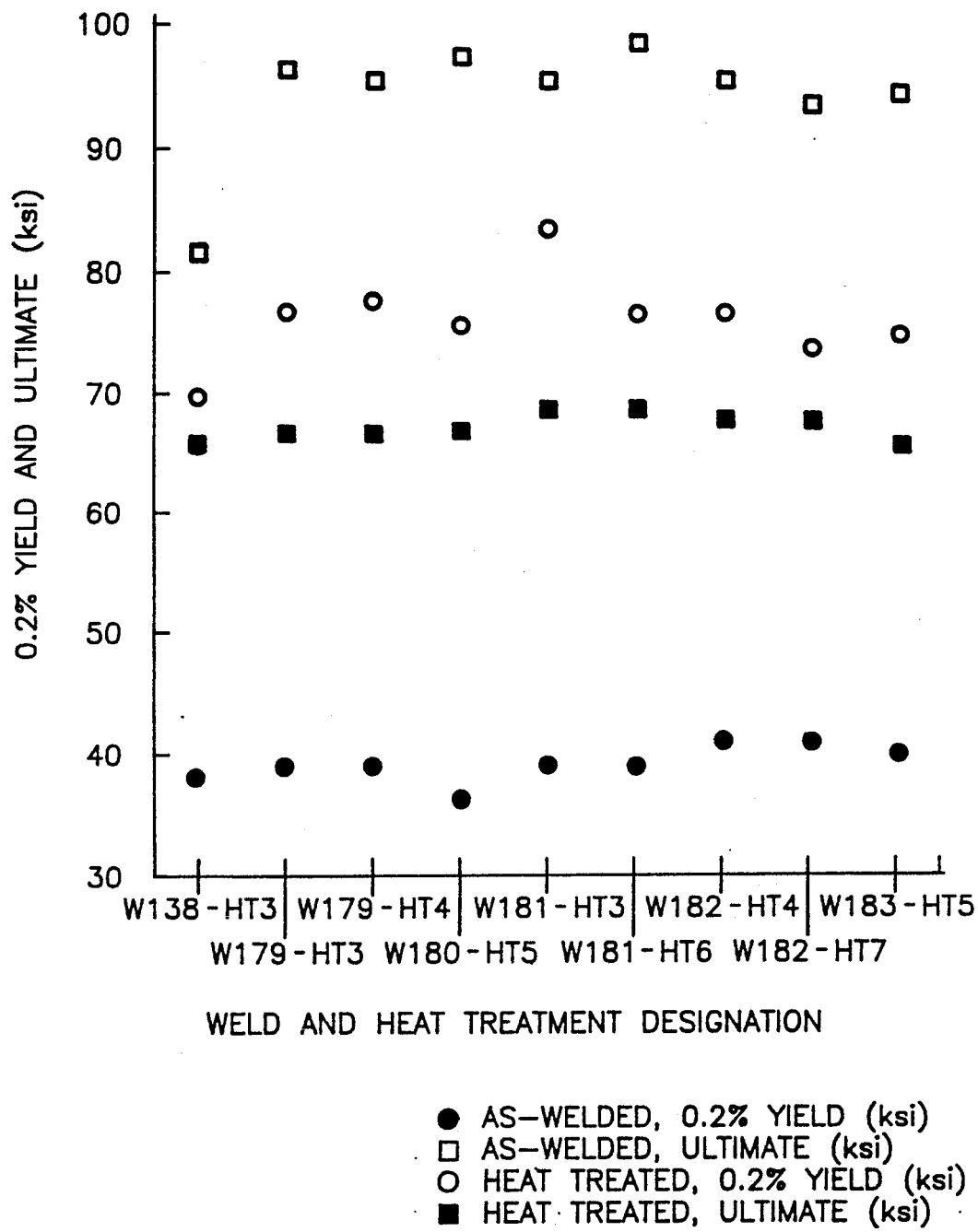
FIG. 5 is a plot showing the yield strengths of as welded and post heat treated welds for a number of samples welded through use of embodiments of the inventions.

It should also be noted that the present methods manner of age hardening tends to increase the thermal and electrical conductivity of the weld filler and HAZ, due to the fact that secondary elements thereof are precipitated out of solid solution. Also, the present method provides for substantial optimization of mass transfer by closely controlling the magnitude of current, and weld wire speed during the welding process for applying the weld filler. The post heat treatment of the weld and HAZ provides for obtaining substantial correspondence of the mechanical characteristics of the resultant weld and HAZ with the parent material of the plates that are joined, in the example given above. FIG. 5 shows a plot for nine different weld samples of as-welded 0.2% yield strength, as-welded ultimate strength, heat treated 0.2% yield strength, and heat treated ultimate strength, for each sample. Note that 100 on the ordinate represents the ultimate strength of the heat treated parent material C 17510 in this example.

Although various embodiments of the invention are shown and illustrated above, they are not meant to be limiting. Those of skill in the art may recognize certain modifications to these embodiments, which modifications are meant to be covered by the spirit and scope of the appended claims.

What is claimed is:

1. A method for joining by welding members including precipitation age hardened materials, comprising the steps of: p1 selecting a weld filler material that has both a composition approximating that of the material of the members being joined, a precipitation age hardening characteristic temperature age threshold below that of the aging kinetic temperature range of the materials being joined, and which after age hardening substantially attains mechanical properties approaching that of the materials being joined, and enhanced thermal/electrical conductivity;

welding said members together in a controlled manner; and post heat treating the resulting weld and heat affected zone (HAZ) for obtaining mechanical characteristics for the associated weld filler and HAZ, substantially approaching that of the parent material of the members joined.

2. The method of claim 1, wherein said welding step further includes:

using arc welding;

selecting a weld wire composition for providing the weld filler material; and controlling the associated magnitude of current, level of voltage, and weld filler wire speed to an associated weld site for substantially optimizing mass transfer.

3. The method of claim 2, wherein said arc welding step includes synergic pulsed gas metal arc welding.

4. The method of claim 2, wherein said welding step further includes the step of forming a symmetric double "U" closed gap weld preparation in said members as abutted together prior to actual welding.

5. The method of claim 2, further including in said welding step prior to welding, the steps of:

retaining said members to be joined in a predetermined position with the portions to be joined butted against one another for exposing one side of said members;

preheating said members to a predetermined temperature;

performing an initial root pass on said one side of said members, in conjunction with said controlling step; and sequentially performing an additional root pass on the opposite side in conjunction with said controlling step.

6. The method of claim 5, further including in said retaining step, the step of installing a ceramic backing for assisting in supporting said members during the performance of said root passes.

7. The method of claim 5, further including subsequent to performing said root passes, the steps of:

performing fill and capping passes sequentially on said opposite side of said members;

rotating said members as retained for exposing said one side thereof for welding; and performing sequentially fill and capping passes on said one side.

8. The method of claim 2, further including in said arc welding step, the step of gas shielding said arc welding process with an inert gas atmosphere.

9. The method of claim 2, further including in said arc welding step the steps of:

selecting a torch tip mechanically matched to the associated weld wire size for insuring adequate high current density pickup, and for providing sufficient heat sinking for producing a high energy density weld and providing adequate dimensional tolerance to account for expansion, variations in wire size, and straightness.

10. The method of claim 9, wherein said step of selecting a weld wire further includes the steps of:

removing surface contaminants from said weld wire; and plating said weld wire with an electrically conductive material for preventing impurity buildup, and for increasing surface conduction for enhancing a conical arc.

11. The method of claim 2, further including in said arc welding step the steps of:

selecting a programmable inverter power supply capable of providing synergic pulsed gas metal arc welding;

selecting a water cooled welding gun; and mounting said welding gun on an index carriage for permitting control of linear travel thereof at programmed speeds.

12. The method of claim 2, wherein said members each consist of copper-beryllium-nickel alloy, said weld wire composition selection step further including selecting a weld wire of copper-beryllium-cobalt material that is richer in beryllium than the alloy of said members, for insuring the precipitation age hardening temperature of the resulting weld filler is lower than that of said members.

13. The method of claim 1, wherein said members are fabricated from material including one of the alloys of nickel, aluminum, and copper dominated metal.

14. A method for joining by welding substantially thick members including precipitation hardenable copper-beryllium-nickel alloy material dominated by copper, comprising the steps of:

selecting a weld wire having a composition approximating that of said members, and a precipitation age hardening temperature lower than the aging kinetic temperature range of the material of said members for providing a desired weld filler;

preparing said members for welding by retaining them abutted together along associated areas to be welded;

arc welding said members together;

controlling in the arc welding process the associated magnitude of current, level of voltage, and weld filler wire speed to the associated weld site for substantially optimizing mass transfer; and post heat treating the resulting weld and heat affected zone (HAZ), at a temperature below the aging kinetic temperature range of the material of said members for obtaining substantially the same mechanical characteristics for the weld filler and HAZ as for the parent material of the members joined, and for enhancing the thermal transfer and electrical conductivity of the weld filler material and material in the HAZ.

15. The method of claim 14, wherein said welding preparation step includes the step of machining a symmetric double "U" shaped closed gap weld preparation along the surfaces of said members to be joined.

16. The method of claim 14, wherein said arc welding step includes a synergic pulsed gas metal arc welding (GMAW) process, and a steady D.C. GMAW process.

17. The method of claim 16, wherein said arc welding step further includes:

programming a programmable inverter power supply for providing said pulsed and said steady D.C. GMAW processing.

18. The method of claim 14, wherein said preparing step further includes preheating said members to a predetermined temperature before welding.

19. The method of claim 14, wherein said members consist of C 17510 material, and said weld filler wire selected in said selecting step consists of C 17200 material, said method further including:

preheating said members to a temperature ranging from 200° F. to 400° F.;

programming said power supply for root pass welding parameters of mean arc current ranging from 250 amperes to 400 amperes, and arc voltage ranging from 27 to 32.5 volts;

programming said power supply for fill and capping pass welding parameters of mean arc current ranging from 350 amperes to 450 amperes, and arc voltage ranging from 27 to 32.5 volts;

feeding said weld filler wire for root passes at a speed range of 375 to 525 inches per minute;

feeding said weld filler wire for fill and capping passes at a speed range of 500 to 575 inches per minute;

programming said power supply for providing pulse parameters including a pulse current ranging from 400 to 500 amperes, a pulse duration ranging from 1 to 3 milliseconds, a background current range of 100 to 300 amperes, and a pulse frequency range of 200 to 300 Hertz;

shielding the associated welding zone with a predetermined inert shielding gas flow at a predetermined flow rate;

mounting an associated water cooled welding gun on an index carriage for permitting control of linear travel thereof at programmed speeds of 10 to 20 inches per minute for root, fill, and capping passes.

20. The method of claim 19, further including in said post heat treatment step, heat treating the weld filler and HAZ for 0.5 to 5 hours at a temperature ranging from 700° F. to 950° F.

21. The method of claim 19, further including prior to said welding step, the steps of:

removing surface contaminants from said weld filler wire;

plating said weld filler wire with substantially pure copper to a predetermined thickness; and selecting a torch tip for said welding gun that is mechanically matched to the size of the associated weld wire, for insuring adequate high current density pickup, and for providing sufficient heat sinking for producing a high energy density weld.

* * * * *